United States Patent
Edlinger

(10) Patent No.: US 6,364,929 B1
(45) Date of Patent: Apr. 2, 2002

(54) METHOD FOR REPROCESSING STEEL SLAGS AND FERRIFEROUS MATERIALS

(75) Inventor: Alfred Edlinger, Baden (CH)

(73) Assignee: "Holderbank" Financière Glarus AG, Glarus (CH)

( * ) Notice: Subject to any disclaimer, the term of this patent is extended or adjusted under 35 U.S.C. 154(b) by 0 days.

(21) Appl. No.: 09/554,432

(22) PCT Filed: Sep. 14, 1999

(86) PCT No.: PCT/AT99/00224

§ 371 Date: May 15, 2000

§ 102(e) Date: May 15, 2000

(87) PCT Pub. No.: WO00/15855

PCT Pub. Date: Mar. 23, 2000

(30) Foreign Application Priority Data

Sep. 15, 1998 (AT) .................................. 1556/98

(51) Int. Cl.⁷ ............................................. C21B 11/00
(52) U.S. Cl. .......................................... 75/453; 75/500
(58) Field of Search .................................. 75/500, 453

(56) References Cited

U.S. PATENT DOCUMENTS

| | | |
|---|---|---|
| 4,000,886 A | 1/1977 | Johnson |
| 4,102,675 A | 7/1978 | Miyashita et al. |
| 5,944,870 A * | 8/1999 | Edlinger .................. 75/434 |

FOREIGN PATENT DOCUMENTS

| | | |
|---|---|---|
| DE | 37 39 344 | 10/1988 |
| WO | WO 97/46717 | 12/1997 |
| WO | WO 99/14381 | 3/1999 |

* cited by examiner

Primary Examiner—Melvyn Andrews
(74) Attorney, Agent, or Firm—Kevin E. Joyce

(57) ABSTRACT

The invention relates to a method for processing steel slags and iron carriers such as, e.g., electric furnace slags, converter slags, fine ores, dusts from the production of steel and millscale, for recovering pig iron and environmentally safe slags. A molten slag bath and a molten iron bath are used at a volume ratio of between 0.5:1 and 1.5:1 and carbon carriers are introduced into the bath and hot air is top-blown. From the starting slags and iron carriers, a mixed slag having a basicity $CaO/SiO_2$ of between 1.2 and 2.5 is adjusted, which is transferred into a hearth-type furnace or a ladle, wherein hot air is top-blown for afterburning at a postcombustion degree $$PC = \frac{CO_2 + H_2O}{CO + CO_2 + H_2 + H_2O}$$

of between 0.70 and 0.85 the CO formed from the carbon in the bath. The hot offgases from the furnace or the ladle are drawn off tangentially to the axis of the mouth of the hot air feeding lance.

8 Claims, 2 Drawing Sheets

METHOD FOR REPROCESSING STEEL SLAGS AND FERRIFEROUS MATERIALS

BACKGROUND OF THE INVENTION

1. Field of the Invention

The invention relates to a method for processing steel slags and iron carriers such as, e.g., electric furnace slags, converter slags, fine ores, dusts obtained from the production of and, millscale, for recovering pig iron and environmentally safe slags.

2. Description of Related Art

From WO 96/24696 a method for producing pig iron or steel and cement clinker from slags has become known, in which iron- oxide-containing molten slags such as, for instance, steel making slag was mixed with iron oxide carriers and lime, whereupon a ferritic slag was formed. After this, the ferritic slag was reduced in a reduction reactor while forming an iron bath and a sinter phase upon combustion of carbon, whereupon the sinter phase was discharged as a clinker.

Slags have a relatively low thermal conductivity and a heat capacity exceeding that of iron by about 1.5 to 2 times. Essential to the economy of such a method is the heat transfer or so-called post-combustion degree that is obtainable. The post-combustion degree is defined as follows:

$$\text{Post-combustion degree} = \frac{CO_2 + H_2O}{CO + CO_2 + H_2 + H_2O} \text{ gaseous phase}$$

So far, only insufficient post-combustion degrees have been ensured by the known modes of procedure. Also the $$\text{heat tranfer} = 1 - \frac{H_g - H_b}{H_{pc}}$$

$H_g$ ... gas enthalpy (at gas temperature)

$H_b$ ... gas enthalpy (at melting temperature)

$H_{pc}$ ... combustion enthalpy (at melting temperature)

does not suffice for an economic mode of operation in the known modes of procedure.

Thermal efficiencies of far more than 70% are achieved neither in conventional blast furnace technologies nor in other processes such as, for instance, fluidized bed processes. Thus, it has already been known to blow into a fluidized bed, together with coal, prereduced and at least partially preheated charges, wherein coal is gasified in a fluidized bed while reducing the charge and sponge iron is melted and drawn off. To make things worse, such meltdown gasification reactions, generally, are optimizied with a view to the pig iron output desired such that no environmentally safe slag will be formed.

In earlier proposals made by the Applicant, methods of the initially defined kind for recovering pig iron and environmentally safe slags have already been described, in which a molten slag bath and a molten iron bath are used at a volume ratio of between 0.5:1 and 1.5:1 and carbon carriers are introduced into the bath while top-blowing hot air.

In addition to the processing of steel slags such as, for instance, electric furnace slags, the known methods, above all, aimed at processing converter slags and also oxygen was blown into the bath, if only facultatively. Compared to electric furnace slags, converter slags and, in particular, LD slags are characterized by a substantially higher basicity CaO/SiO$_2$ of usually more than 3, whereas electric furnace slags have a slightly lower basicity. Considering the various options discussed in earlier proposals, the realization of the method in a converter was the primary objective, thus using a more or less complex blowing technology. Yet, in principle, that earlier method was, of course, suitable also for use in furnaces or ladles.

SUMMARY OF THE INVENTION

The present invention aims to improve the known methods for. use primarily with electric furnace slags and, at the same time, to get by with less apparative expenditure than according to the earlier proposals. To solve this object, the method of the initially defined kind essentially resides in that a mixed slag having a basicity CaO/SiO$_2$ of between 1.2 and 2.5 is adjusted from the starting slags and iron carriers and the mixed slag is transferred into a hearth-type furnace or a ladle, that hot air is top-blown for afterburning at a post-combustion degree PC=(CO$_2$+H$_2$O)/CO+CO$_2$+H$_2$+H$_2$O) of between 0.70 and 0.85 the CO formed from the carbon in the bath, and that the hot offgases from the furnace or the ladle are drawn off tangentially to the axis of the mouth of the hot air feeding lance. The use of furnaces or ladles enables the application of substantially more cost-effective devices in which also the refractory lining element of costs is substantially reduced. Taking into account that, in the instant case, a higher wear of refractory materials may be put up with without excessive investment costs, a substantially higher basicity of up to 2.5 is, thus, regarded as admissible in the method according to the invention such that, in particular, electric furnace slags may be employed directly without a lime batch or a remarkable lowering of the basicity. At the same time, it is, however, also feasible in the context of an electric steel making plant to ensure the perfect control of the waste streams occurring in electric steel making plants. There, besides electric furnace slag also ladle slags, dusts, millscale and furnace break-off material occur as waste substances, which may be disposed of or utilized immediately by the method according to the invention, whereby a favorably priced molten pig iron substantially free of trace elements will be obtained at the same time. In the method according to the invention by increasing post-combustion to values of between 0.7 and 0.85 and, in particular, values of around 0.8, the control of the method according to the invention has been substantially facilitated. It is merely required to care for the adequate supply of carbon into the bath and ensure the appropriate blending of the slag with the bath and subsequently afterburn the CO dissolved in the slag by the aid of hot air impinging at a high speed. Blowing oxygen or hot air into or through the bath may be obviated completely such that the apparative expenditure can be considerably reduced. Carbon basically may be fed via simple lances or via bottom tuyeres, which does not imply a substantial increase in the costs for the ladle or the furnace. Yet, also carbon may be blown into the bath through submerged lances. In a particularly advantageous manner, carbon also may be top-charged directly onto the melt bath in a coarse grained form, using a bottom-stirred ladle. What is, however, also essential to the efficiency of post-combustion, and hence the high heat transfer and the obviation of additional heating of the furnace or the ladle by the aid of external heating means, is the evacuation of the hot furnace offgases proposed by the invention. According to the invention, this evacuation is to be effected tangentially to the axis of the mouth of the hot air feeding lance. Such a gas flow control renders feasible to not only safely obtain the desired post-combustion degree, but also ensure the desired heat transfer such that a number of waste materials from electric steel making plants as initially described can be disposed of or utilized in a cost-effective manner.

Advantageously, the method according to the invention is carried out in a manner that the offgases drawn off are supplemented with additives selected from the group consisting of fine ores, dusts, millscale and optionally additional fuel in a further, external post-combustion course and the heated solids are blown onto the slag together with the hot air. In said post-combustion course, also waste streams from an electric steel making plant may obviously be melted at least partially, wherein, due to the adjustment of a post-combustion degree of between 0.7 and 0.85 within the furnace or ladle, sufficient chemical energy will still be contained in the offgases in order to ensure such an effective afterburning outside the furnace or ladle. After this, or alternatively, it may, however, also be proceeded in that the combustion offgases of the post-combustion course are conducted via a hot cyclone for separating the possibly liquefied solids and a heat exchanger for heating the hot air, thus attaining a particularly high energy yield.

The partially cold waste streams advantageously can be melted prior to charging. The additives are preferably melted in a melting cyclone and admixed in the liquid form to the basic slags such as, e.g., steel slags or electric furnace slags. The mixed slag is transferred into the furnace or the ladle and the hot $O_2$-containing propellants of the melting cyclone are top-blown onto the slags as hot air.

An effective limitation of the post-combustion occurring within the furnace or the ladle and a suitable convection with a high heat transfer occurring in the interior of the gas space of the furnace or the ladle may be enhanced even further. A pressure reduced relative to the gas pressure prevailing within the gas space of the furnace or the ladle is maintained in the duct for the hot offgases from the furnace or the ladle.

Generally, the process control according to the invention primarily affords advantages in connection with the operation of an electric steel making plant, wherein concentrated zinc or zinc-oxide-containing products formed from occurring dusts may be further upgraded at place or directly delivered to metallurgical processors. The strongly basic metallurgical residual substances as well as break-off materials such as, e.g., furnace break-off material, may be converted into a high-quality clinker substitute and high-grade pig iron by the addition of favorably priced acidic fine ores. Advantageously, also blast furnace slags may be used for lowering the basicity of electric furnace or converter slags.

BRIEF DESCRIPTION OF THE DRAWINGS

The method according to the invention may be realized by means of the devices schematically illustrated in the drawings.

Figure 1:
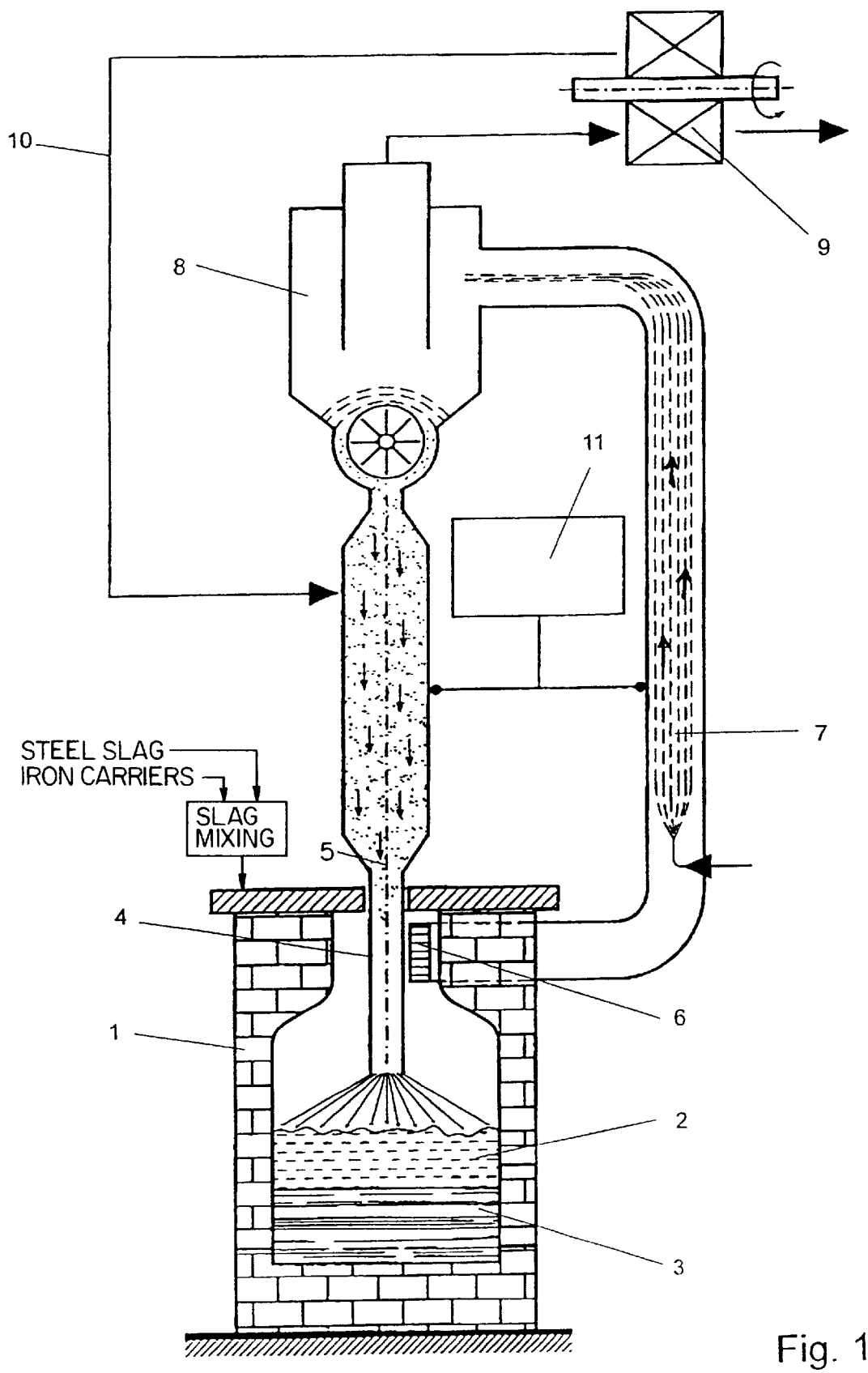
FIG. 1 depicts a first embodiment of a device for carrying out the method according to the invention.

In the following, the invention will be explained in more detail by way of an exemplary embodiment.

DETAILED DESCRIPTION OF EMBODIMENTS OF THE INVENTION

Electric furnace slag, ladle slag, furnace dusts as well as fine ores having the following composition were used:

| Electric furnace slag | |
| --- | --- |
| Component | Portion (%) |
| CaO | 35 |
| $SiO_2$ | 14 |
| MgO | 4 |
| $Al_2O_3$ | 6 |
| MnO | 5 |
| $TiO_2$ | 0.3 |
| $Cr_2O_3$ | 1 |
| $Na_2O$ | 0.1 |
| $K_2O$ | 0.1 |
| $P_2O_5$ | 1 |
| FeO | 32 |
| Total | 98.50 |
| C/S | 2.50 |

Such charging materials occur in an electric furnace steel making plant, electric furnace slag usually occurring in quantities 10 to 12 times higher that those of ladle slags or filter dusts. In order to lower the basicity, a fine ore grade of the following composition was used as said acidic component:

| Fine ore | |
| --- | --- |
| Component | Portion (%) |
| $Fe_3O_4$ | 81 |
| $Mn_2O_3$ | 0.3 |
| P | 3.5 |
| $SiO_2$ | 10 |
| $Al_2O_3$ | 1.7 |
| CaO | 2.3 |
| MgO | 1 |
| Total | 99.8 |
| C/S | 0.23 |

For cement-technological reasons, a basicity $CaO/SiO_2$ of 1.5 and an $Al_2O_3$ content of between 10 and 15wt.% was adjusted for the target slag. The mixing balance is calculated as follows:

$$(C/S) = \frac{X \cdot CaO \text{ (fine ore)} + CaO \text{ (mixed slag)}}{(X) \cdot SiO_2 \text{ (fine ore)} + SiO_2 \text{ (mixed slag)}}$$

Hence follows, as a function of the basicity (C/S) of the target slag, the fine ore portion (X) to be added:

$$X = \frac{CaO \text{ (mixed slag)} - (C/S) \cdot SiO_2 \text{ (mixed slag)}}{(C/S) \cdot SiO_2 \text{ (fine ore)} + CaO \text{ (fine ore)}}$$

At an annual output of the steel making plant of 60,000 annual tons electric furnace slag, 5,000 annual tons ladle slag and 4,500 annual tons filter dust, a mixed slag having the following analysis results:

Ladle slag

| Component | Portion (%) |
|---|---|
| Fe, FexOy | 0.0 |
| CaO | 54.0 |
| MgO | 4.3 |
| MnO | 0.0 |
| SiO$_2$ | 20.0 |
| Al$_2$O$_3$ | 6.2 |
| ZnO | 0.0 |
| TiO$_2$ | 0.0 |
| Cr$_2$O$_3$ | 0.1 |
| Na$_2$O | 0.0 |
| P$_2$O$_5$ | 0.0 |
| CaF | 8.2 |
| Balance | 7.3% |
| Total | 100.0% |
| C/S | 2.7 |

Filter dust

| Component | Portion (%) |
|---|---|
| Fe, FexOy | 19.2 |
| CaO | 14.3 |
| MgO | 0.0 |
| MnO | 2.4 |
| SiO$_2$ | 3.9 |
| Al$_2$O$_3$ | 2.6 |
| ZnO | 29.0 |
| TiO$_2$ | 0.0 |
| Cr$_2$O$_3$ | 0.5 |
| Na$_2$O | 1.0 |
| P$_2$O$_5$ | 0.4 |
| H$_2$O | 20.0 |
| Balance | 6.7 |
| Total | 100.0 |
| C/S | 3.7 |

Mixed slag

| Component | Portion (%) |
|---|---|
| CaO | 36 |
| SiO$_2$ | 15 |
| MgO | 3.9 |
| MnO | 4.6 |
| FeO | 29 |
| Al$_2$O$_3$ | 6 |
| ZnO | 2 |
| TiO$_2$ | 0.3 |
| Cr$_2$O$_3$ | 0.9 |
| Na$_2$O | 0.1 |
| P$_2$O$_5$ | 0.9 |
| CaF$_2$ | 0.6 |
| Total | 99.3 |
| C/S | 2.4 |

In order to adjust the desired target basicity of 1.5, 1 ton mixed slag was blown with 1.06 tons fine ore, from which results a preslag analysis as follows:

Preslag

| Component | Portion (%) |
|---|---|
| CaO | 19 |
| SiO$_2$ | 12.7 |
| MgO | 2.5 |
| MnO | 2.4 |
| FeO | 57 |
| Al$_2$O$_3$ | 3.9 |
| ZnO | 1 |
| TiO$_2$ | 0.15 |
| Cr$_2$O$_3$ | 0.45 |
| Na$_2$O | 0.05 |
| P$_2$O$_5$ | 0.45 |
| CaF$_2$ | 0.3 |
| Total | 99.9 |
| C/S | 1.5 |

After a largely complete reduction of this slag carried out, for instance, in a reduction ladle similar to a bottom-flushed secondary metallurgical ladle, the following slag composition and the following iron bath composition were obtained:

Slag

| Component | Portion (%) |
|---|---|
| CaO | 49.2 |
| SiO$_2$ | 32.9 |
| MgO | 6.4 |
| Al$_2$O$_3$ | 10.1 |
| TiO$_2$ | 0.4 |
| Na$_2$O | 0.1 |
| CaF$_2$ | 0.8 |
| Total | 99.9 |
| C/S | 1.5 |

Iron

| Component | Portion (%) |
|---|---|
| Mn | 3.8 |
| Cr | 0.6 |
| P | 0.4 |
| C | 4 |
| Fe | 91 |

In total, 1 ton preslag yields 0.386 ton slag and 0.442 ton iron bath, the iron obtainable standing out for containing neither copper nor tin. By intermediate refining and the formation of small amounts of a highly concentrated special slag, the elements manganese, chromium and phosphorus may readily be eliminated from such a bath composition in a conventional manner. The selective separation of P advantageously may be effected under reducing conditions:

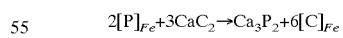
$$2[P]_{Fe} + 3CaC_2 \rightarrow Ca_3P_2 + 6[C]_{Fe}$$

such that a "high-chromium-containing" pig iron will be available to the electric furnace.

It is apparent from the above exemplary embodiment that the waste streams of an electric furnace steel making plant can be controlled in a simple manner. In addition to the initially mentioned additives and dusts, it is, of course, also possible to successfully use filter dust melts from waste incineration plants, wherein it must, however, be taken care that such filter dust melts are largely free of heavy metals. The usual composition of such filter ashes or fly ashes from thermal power stations is indicated below:

Ashes

| Component | Portion (%) |
|---|---|
| L.o.I. | 7 |
| $SiO_2$ | 24.4 |
| $Al_2O_3$ | 11.8 |
| $Fe_2O_3$ | 2.3 |
| CaO | 12.7 |
| MgO | 2.0 |
| $SO_3$ | 13.3 |
| $K_2O$ | 5.2 |
| $Na_2O$ | 5.9 |
| $TiO_2$ | 1.2 |
| $Mn_2O_3$ | 0.12 |
| $P_2O_5$ | 1.1 |
| Cl | 5.5 |
| Cd | 0.06 |
| Cr | 0.13 |
| Cu | 0.37 |
| Ni | 0.03 |
| Pb | 2 |
| Zn | 3 |
| Total | 98.11 |
| Component | 0.52 |

If such fly ashes or waste incineration filter ashes are employed in order to lower the basicity to values of between 1.5 and 1.2, approximately 0.35 ton of the slag melt recovered from waste incineration plants is to be used per ton of eletric furnace slage in accordance with the calculation methods initially applied. The slag melt as produced from waste incineration plants had the following composition:

Slag melt

| Component | Portion (%) |
|---|---|
| $SiO_2$ | 36 |
| $Al_2O_3$ | 17 |
| $Fe_2O_3$ | 3 |
| CaO | 18 |
| MgO | 3 |
| S | 1 |
| $K_2O$ | 7.6 |
| $Na_2O$ | 8 |
| $TiO_2$ | 1.7 |
| $Mn_2O_3$ | 0.17 |
| $P_2O_5$ | 1.16 |
| Cr | 0.15 |
| Cu | 0.15 |
| Pb | 0.15 |
| Zn | 0.15 |
| Total | 97.23 |

The mixed slag obtained had the following composition:

Mixed slag

| Component | Portion (%) |
|---|---|
| CaO | 30 |
| $SiO_2$ | 20 |
| MgO | 3.8 |
| $Al_2O_3$ | 9 |
| $Mn_2O_3$ | 3.8 |
| $TiO_2$ | 0.7 |
| S | 0.3 |
| $Cr_2O_3$ | 1 |
| Cu | 0.04 |
| Pb | 0.04 |
| Zn | 0.04 |
| $Na_2O$ | 2.2 |
| $K_2O$ | 2 |
| $P_2O_5$ | 1 |
| $Fe_3O_4$ | 24.7 |
| Total | 98.62 |
| C/S | 1.5 |

After the reduction of the above mixed slag, the following final slag was formed in addition to a metal bath:

Final slag

| Component | Portion (%) |
|---|---|
| CaO | 44 |
| $SiO_2$ | 29.4 |
| MgO | 5.6 |
| $Al_2O_3$ | 13.2 |
| $TiO_2$ | 1 |
| $Na_2O$ | 3 |
| $K_2O$ | 3 |
| Total | 99.2 |
| C/S | 1.5 |

From 1 ton mixed slag, 0.68 ton of this slag as well as 0.23 ton of an iron bath were formed, whose directional analysis was determined as follows:

Iron bath

| Component | Portion (%) |
|---|---|
| Mn | 10 |
| Cr | 4.4 |
| Cu | 0.15 |
| P | 4.3 |
| C | 4 |
| Fe | 76 |

Due to the use of waste incineration ashes, an iron bath containing residual copper was formed, yet said copper value should probably be graded acceptable for a number of products. Here again, intermediate refining of the iron bath formed is recommended in order to thereby ensure the slagging to special slags at least of manganese, chromium and phosphorus, to which end conventional modes of procedure may be applied. The special slag formed in such a refining process will contain relatively high portions of noxious matter, which may be utilized separately though.

Thus, in the ladle or in the furnace also slags and dusts from other combustion plants such as, for instance, waste incineration plants or thermal power stations may be disposed of simultaneously in a simple manner, the process control according to the invention being of a particularly high relevance in terms of economy primarily in electric furnace steel making plants, as pointed out in the beginning.

In FIG. 1, 1 serves to denote a hearth-type furnace containing a bath in which the slag 2 floats on the iron charge 3. Slag supplied to the funace is formed in a slag mixer 12 into which is introduced steel slag and iron carriers. Hot air for afterburning the CO formed from the carbon of the bath is top-blown through the feeding lance 4, the hot offgases from the furnace 1 being drawn off tangentially to the axis 5 of the mouth of the hot air feeding lance 4 through an opening 6. In the post-combustion course 7, the offgases drawn off are supplemented with additives selected from the group consisting of fine ores, dusts, millscale and optionally additional fuel and conducted via a hot cyclone 8 for separating the optionally liquefied solids and a gas regenerative heat exchanger 9. In the gas regenerative heat exchanger 9, cold air is heated, whereupon the hot air is fed to the feeding lance 4 via a duct 10 and top-blown onto the slag bath 2 along with the liquefied solids separated in the hot cyclone 8. A dust regenerative heat exchanger 11 may additionally be arranged between the hot air feeding lance 4 and the post-combustion course 7 for transferring heat of the offgases and additives in course 7 to the lance.

Figure 2:
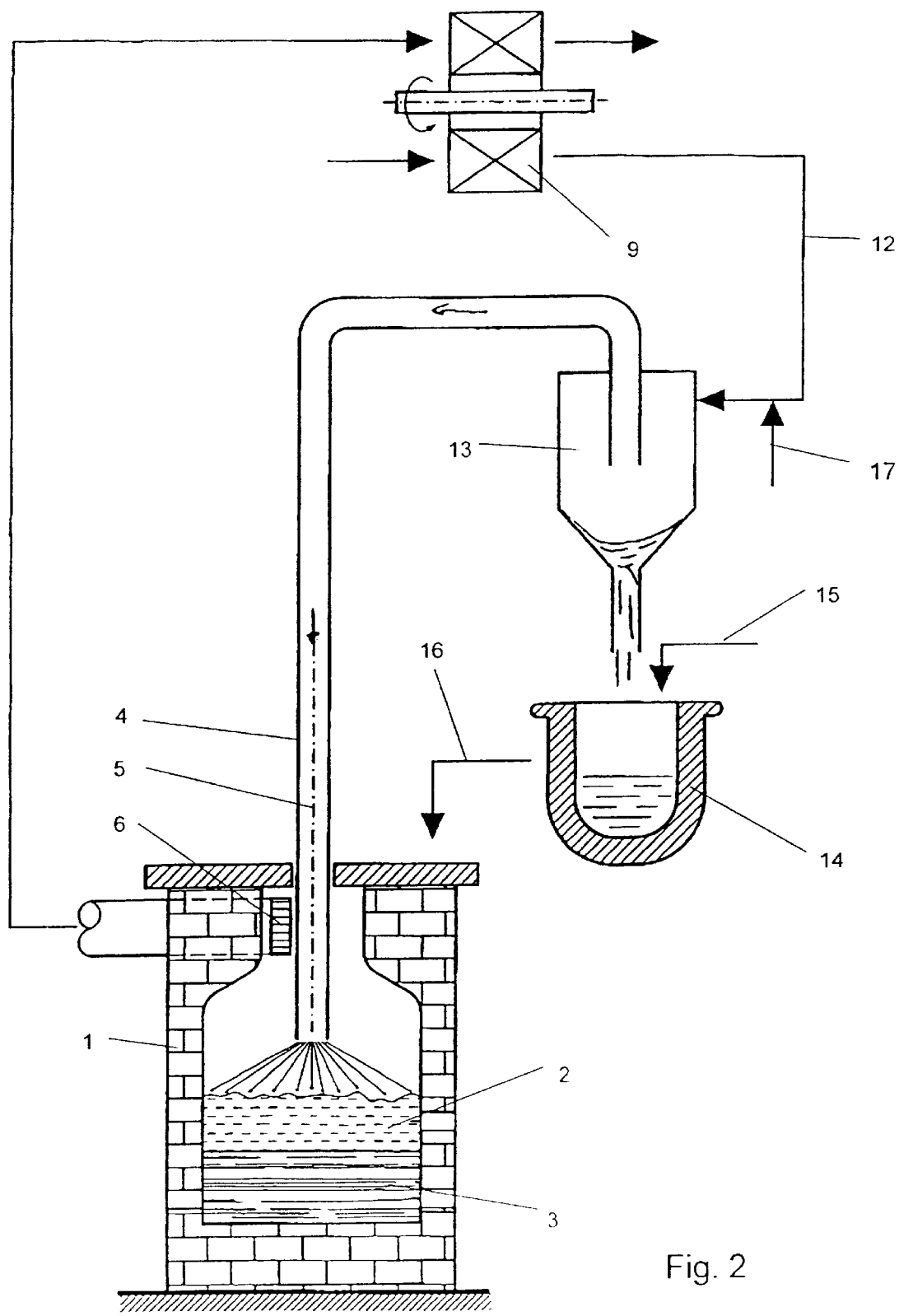
FIG. 2 depicts a second embodiment of a device for carrying out the method of the invention.

A modified embodiment of the device according to FIG. 1 is illustrated in FIG. 2, wherein the reference numerals have been retained for identical parts. In this embodiment, the combustion offgases drawn off through the opening 6 of the furnace 1 are immediately supplied to a gas regenerative heat exchanger for heating the hot air. Via a duct 12, hot air is fed to a melting cyclone 13 in which the additives introduced via the duct 17 that runs into duct 12 are melted. The liquefied additives in a ladle 14 are mixed with the steel slag supplied via duct 15, whereupon the mixed slag formed is transferred into the furnace 1 as is schematically indicated by 16. The hot $O_2$-containing propellants of the melting cyclone 13 are top-blown onto the slag 2 as hot air via the feeding lances 4.

What is claimed is:

1. A method for processing steel slags and iron carriers, the method comprising:

mixing the steel slags with the iron carriers to obtain a mixed slag having a basicity $Ca/SiO_2$ of between 1.2 and 2.5;

transferring the mixed slag and carbon carriers into a hearth furnace or ladle containing molten iron, the ratio of the mixed slag to the molten iron being between 0.5:1 and 1.5:1;

top-blowing hot air onto the mixed slag within the furnace or ladle through a mouth of a lance extending within the furnace or ladle for afterburning carbon monoxide (CO) formed from carbon in the mixed slag at a post-combustion degree PC $(CO_2+H_2O)/(CO+CO_2+H_2+H_2O)$ of between 0.70 and 0.85 to generate hot offgases; and drawing off the hot offgases tangentially to an axis of the mouth of the feeding lance.

2. A method according to claim 1, further comprising:

supplementing the drawn off offgases with solid additives selected from the group consisting of fine ores, dusts, and millscale and optionally additional fuel in a post-combustion course; and blowing the solid additives heated by the drawn off offgases into the hearth or ladle onto the mixed slag with the hot air.

3. A method according to claim 2, further comprising conducting the offgases containing the solid additives from the post-combustion course to a hot cyclone for separating out liquefied solids in the offgases, and conducting the offgases to a heat exchanger for heating and generating the hot air.

4. A method according to claim 1, further comprising:

supplementing the drawn off offgases with solid additives selected from the group consisting of fine ores, dusts, and millscale and optionally additional fuel in a post-combustion course; and melting the solid additives in a melting cyclone and admixing the melted additives with the hot air blown onto the mixed slag within the furnace or ladle, wherein said top-blowing of the hot air through a feeding lance comprises top-blowing hot $O_2$-containing propellants from the melting cyclone through the feeding lance and onto the mixed slag as the hot air.

5. A method according to claim 1, further comprising maintaining a duct for the drawing off of the offgases at a reduced pressure relative to a pressure within the furnace or ladle.

6. A method according to claim 1, wherein said transferring of carbon carriers comprises top charging the carbon carrier as a coarse grain into the furnace or ladle.

7. A method according to claim 1, wherein said obtaining of the initial basicity $CaO/SiO_2$ of the mixed slag comprises mixing the mixed slag with blast furnace slags.

8. A method according to claim 1, further comprising separating phosphorus from the slag under reducing conditions with the aid of calcium carbide prior to transfer into the hearth furnace or ladle.

* * * * *